(12) United States Patent
Guo et al.

(10) Patent No.: US 12,345,294 B2
(45) Date of Patent: Jul. 1, 2025

(54) STATOR OF MAGNETIC LEVITATION BEARING, MAGNETIC LEVITATION BEARING, AND COMPRESSOR

(71) Applicant: GREE ELECTRIC APPLIANCES, INC. OF ZHUHAI, Zhuhai (CN)

(72) Inventors: Weilin Guo, Zhuhai (CN); Fang Zhang, Zhuhai (CN); Gao Gong, Zhuhai (CN); Chao Zhang, Zhuhai (CN); Xin Li, Zhuhai (CN); Hao Liang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 161 days.

(21) Appl. No.: 18/002,185

(22) PCT Filed: Apr. 30, 2021

(86) PCT No.: PCT/CN2021/091352
§ 371 (c)(1),
(2) Date: Dec. 16, 2022

(87) PCT Pub. No.: WO2022/068198
PCT Pub. Date: Apr. 7, 2022

(65) Prior Publication Data
US 2023/0340993 A1   Oct. 26, 2023

(30) Foreign Application Priority Data

Sep. 29, 2020 (CN) .......................... 202011052716.8

(51) Int. Cl.
*F16C 32/04* (2006.01)
(52) U.S. Cl.
CPC ........ *F16C 32/0461* (2013.01); *F16C 32/047* (2013.01); *F16C 2226/32* (2013.01)

(58) Field of Classification Search
CPC .......................... F16C 32/0461; F16C 32/047; F16C 2226/32; F16C 2202/22; F16C 2240/46; F16C 2380/26; F16C 32/044
(Continued)

(56) References Cited

U.S. PATENT DOCUMENTS

| 10,080,794 B2 | 9/2018 | Perez et al. |
| 2015/0381008 A1* | 12/2015 | Shimamoto .............. H02K 5/12 |
| | | 310/344 |
| 2016/0305478 A1 | 10/2016 | Jawdat |

FOREIGN PATENT DOCUMENTS

| CN | 108679085 A | * 10/2018 | ............ F16C 32/044 |
| CN | 109882504 A | 6/2019 | |

(Continued)

OTHER PUBLICATIONS

CN108679085A English translation (Year: 2024).*

(Continued)

*Primary Examiner* — Christopher M Koehler
*Assistant Examiner* — Viswanathan Subramanian
(74) *Attorney, Agent, or Firm* — Christensen O'Connor Johnson Kindness PLLC

(57) ABSTRACT

The present disclosure relates to a stator of a magnetic levitation bearing, a magnetic levitation bearing, and a compressor. The stator of the magnetic levitation bearing includes a stator core (4), a stator coil (5) wound around the stator core (4), a housing (2) sleeved outside the stator core (4) and having a clearance fit or a transition fit with the stator core (4), and a potting component (3) filled between the housing (2) and the stator core (4).

16 Claims, 4 Drawing Sheets

(58) Field of Classification Search
USPC .......................................................... 310/90
See application file for complete search history.

(56) References Cited

FOREIGN PATENT DOCUMENTS

| | | | |
|---|---|---|---|
| CN | 110350701 A | * | 10/2019 |
| CN | 209838958 U | | 12/2019 |
| CN | 110864043 A | | 3/2020 |
| CN | 112160986 A | | 1/2021 |
| CN | 205278108 U | | 1/2021 |
| EP | 1 757 826 A1 | | 2/2007 |
| WO | WO-2019189528 A1 | * | 10/2019 |

OTHER PUBLICATIONS

CN110864043A English translation (Year: 2024).*
CN110350701A English translation (Year: 2025).*
WO2019189528A1 English translation (Year: 2025).*
Extended European Search Report mailed Feb. 12, 2024, issued in corresponding European Application No. EP 21 87 3861 filed Apr. 30, 2021, 17 pages.
International Search Report mailed Jul. 28, 2021, issued in corresponding International Application No. PCT/CN2021/091352, filed Apr. 30, 2021, 2 pages.
Office Action mailed Feb. 20, 2025, issued in corresponding European Application No. EP 21 873 861.5 filed Apr. 30, 2021, 10 pages.

* cited by examiner

STATOR OF MAGNETIC LEVITATION BEARING, MAGNETIC LEVITATION BEARING, AND COMPRESSOR

CROSS-REFERENCE TO RELATED APPLICATION

This application is a National Stage of International Application No. PCT/CN2021/091352, filed Apr. 30, 2021, which claims priority to Chinese Patent Application No. CN202011052716.8, filed on Sep. 29, 2020. The contents of above identified applications are hereby incorporated herein in its-their entirety by reference.

TECHNICAL FIELD

The present disclosure relates to the field of electrical equipment, and in particular, to stators of magnetic levitation bearings, magnetic levitation bearings, and compressors.

BACKGROUND

Different from traditional roller bearings and sliding bearings, magnetic levitation bearings adopt electromagnetic force or permanent magnetic force to realize levitation of rotors in the air and maintain a non-contact state of the rotors with other objects. The magnetic levitation bearings have excellent properties such as high precision, high rotating speed, no lubrication, and less wear. As shown in FIG. 1, a stator assembly of a radial magnetic levitation assembly includes a radial stator core 2, a housing 1 for installing the radial stator core, and coils 3 wound around magnetic poles of the radial stator core. The circumferential and axial positioning of the stator core 2 is usually realized by an interference fit between the stator core 2 and the housing 1. In shrink-fitting technique, the stator core 2 is set into the housing 1 at an increased temperature to ensure the interference, which however results uncontrollable dimensional deformation of the housing 1 and increases tolerances of form and position of the housing 1. The housing 1 in well protection needs to be further processed, which increases the working hours. In addition, the processing is difficult due to clamping deformation and machine tool setting error, and thus it is difficult to ensure the processing precision. Moreover, in the shrink-fitting, the housing will have uneven shrinkage in cooling, causing extrusion deformation of the stator core, which affects the precision of the bearing.

There are the following technical problems in the shrink-fitting technique for fixing the stator core in the housing:
1. The housing is deformed due to the shrink-fitting between the housing and the stator core, and thus the dimension and tolerances of form and position of the housing are uncontrollable, requiring a further process to ensure the precision.
2. Due to the interference fit between the housing and the stator core, the stator core is deformed and will have increased tolerances of form and position, resulting in poor control accuracy of the bearing.
3. The interference between the stator core and the housing will become smaller at a high temperature working environment, resulting unreliable axial and circumferential positioning of the stator core, which may be a potential safety hazard.
3. In order to ensure the circumferential or axial positioning, the structure of the stator core needs to be modified, which will affects magnetic density distribution of the stator core, and thus the bearing performance needs to be re-checked.

SUMMARY

The present disclosure aims to provide a stator of a magnetic levitation bearing, a magnetic levitation bearing, and a compressor.

According to an aspect of embodiments of the present disclosure, a stator of a magnetic levitation bearing is provided. The stator includes:
  a stator core;
  a stator coil wound around the stator core;
  a housing sleeved outside the stator core and having a clearance fit or a transition fit with the stator core; and
  a potting component filled between the housing and the stator core.

In some embodiments, an inner surface of the housing includes a recessed portion.

In some embodiments, the potting component includes a first protruding portion filled in the recessed portion.

In some embodiments, the housing includes a housing positioning hole, the stator core includes a stator positioning hole, and the stator of the magnetic levitation bearing further includes a positioning member extending through the housing positioning hole and the stator positioning hole.

In some embodiments, an outer peripheral surface of the stator core includes a bonding groove, and the stator positioning hole is disposed at a bottom of the bonding groove.

In some embodiments, the potting component further includes a second protruding portion filled in the bonding groove.

In some embodiments, the bonding groove extends in an axial direction of the housing.

In some embodiments, the bonding groove is a plurality of bonding grooves, and the plurality of bonding grooves are distributed along a circumferential direction of the stator core.

According to another aspect of the present disclosure, a magnetic levitation bearing is also provided. The magnetic levitation bearing includes the above-described stator of the magnetic levitation bearing.

According to another aspect of the present disclosure, a compressor is also provided. The compressor includes the above-described magnetic levitation bearing.

Other features of the present disclosure and advantages thereof will become apparent from the following detailed description of exemplary embodiments of the present disclosure with reference to the accompanying drawings.

BRIEF DESCRIPTION OF THE DRAWINGS

The accompanying drawings of the specification constituting a part of the present disclosure are used to provide a further understanding of the present disclosure, and the exemplary embodiments and descriptions of the present disclosure are used to explain the present disclosure, and do not constitute an improper limitation of the present disclosure. In the drawings.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. The following description of at least one exemplary embodiment is actually merely illustrative and shall not limit the present disclosure, its applications or uses in any way. Based on the embodiments in the present disclosure, all other embodiments obtained by those of ordinary skill in the art without creative efforts shall fall within the protection scope of the present disclosure.

Figure 1:
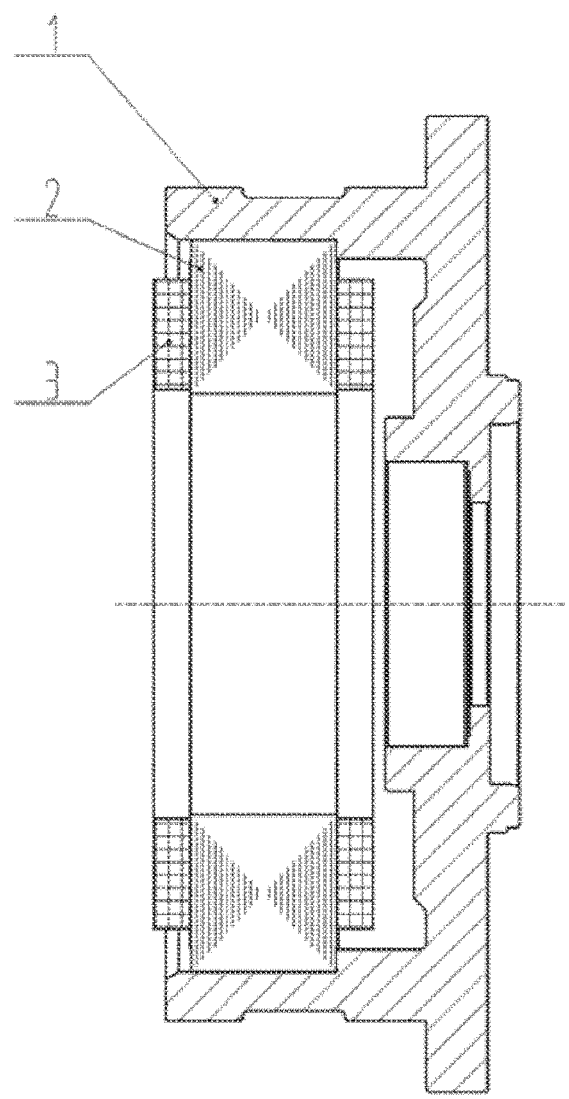
FIG. 1 shows a schematic longitudinal sectional view of a magnetic levitation bearing in related art.
Figure 2:
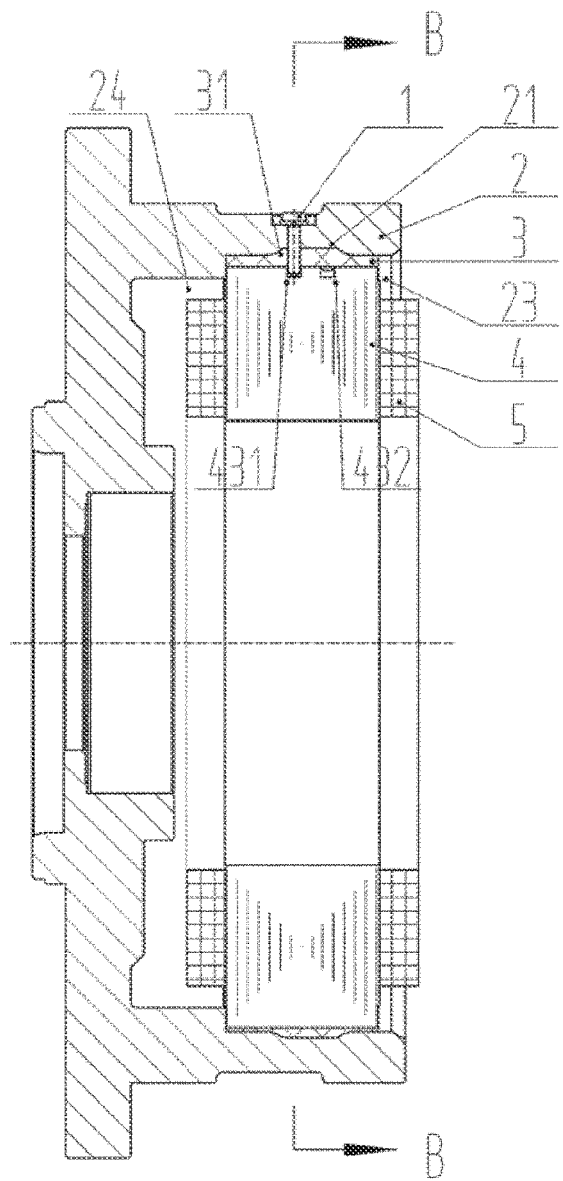
FIG. 2 shows a schematic longitudinal sectional view of a magnetic levitation bearing according to an embodiment of the present disclosure.
Figure 3:
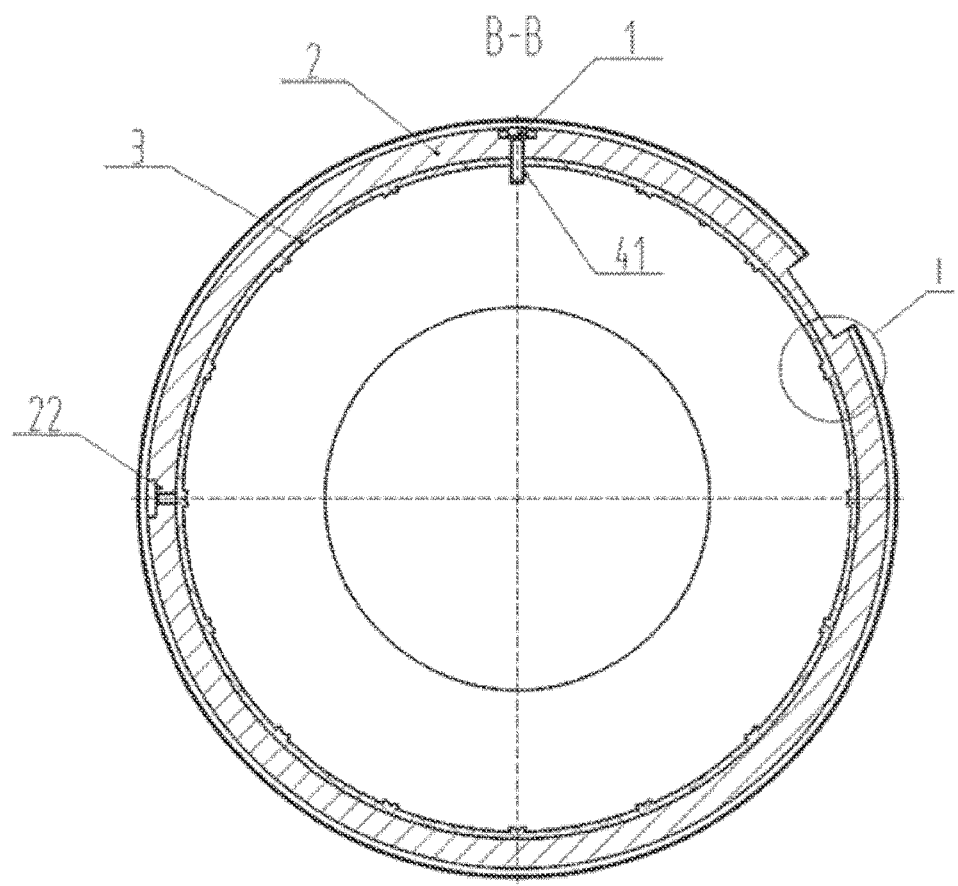
FIG. 3 shows a schematic sectional view taken along B-B of the magnetic levitation bearing shown in FIG. 2.

FIG. 2 shows a schematic longitudinal sectional view of a magnetic levitation bearing according to an embodiment of the present disclosure. FIG. 3 shows a schematic sectional view taken along B-B of the magnetic levitation bearing shown in FIG. 2.

Referring to FIG. 2 and FIG. 3, a stator of the magnetic levitation bearing in the present embodiment includes a stator core 4, a stator coil 5 wound around the stator core 4, and a housing 2 sleeved outside the stator core 4. The housing 2 and the stator core 4 are in a clearance fit or a transition fit with each other.

The stator of the magnetic levitation bearing further includes a potting component 3 filled between the housing 2 and the stator core 4.

An inner surface of the housing 2 includes a recessed portion 21. The recessed portion 21 can reduce a mating area between the housing 2 and the stator core 4, thereby reducing the difficulty of processing and assembling.

As shown in FIG. 2, the potting component 3 includes a first protruding portion 31 filled in the recessed portion 21. The recessed portion 21 is in an annular shape extending along a circumferential direction of the housing 2. The first protruding portion 31 of the potting component 3 is filled in the recessed portion 21 to limit an axial movement of the stator core 4 relative to the housing 2.

The housing 2 includes a housing positioning hole 22. The stator core 4 includes a stator positioning hole. The stator of the magnetic levitation bearing further includes a positioning member 1 extending through the housing positioning hole 21 and the stator positioning hole.

Wherein, the positioning member 1 can be a bolt, a pin, etc.

The stator positioning hole is disposed at the position corresponding to the housing positioning hole 22. The stator positioning hole includes a first stator positioning hole 431 and a second stator positioning hole 432. The positioning member 1 and the housing positioning hole 22 are in a one-to-one correspondence. The positioning member 1 extends though the corresponding housing positioning hole 22 and into the stator positioning hole to limit the movement of the stator core 4 relative to the housing 2 in the axial and circumferential directions.

The first stator positioning hole 431 and the second stator positioning hole 432 are distributed side by side along the axial direction of the stator core 4. The positioning member 1 can extend through the housing positioning hole 22 and into the first stator positioning hole 431, and can alternatively extend through the housing positioning hole 22 and into the second stator positioning hole 432. Therefore, in the present embodiment, the stator core 4 is suitable for being assembled with different housings 2.

In some embodiments, in the axial direction of the stator core 4, the first stator positioning hole 431 is located in the middle of the stator core 4, and the second stator positioning hole 432 is located between one end of the stator core 4 and the first stator positioning hole 431.

Since the first stator positioning hole 431 is located in the middle of the stator core 4, it is easy to have the problem that the stator core 4 is assembled to the housing 2 with the two ends reversed by the operator. By using the second stator positioning hole 432 located between the first stator positioning hole 431 and the end of the stator core as an identification, the operator can avoid the occurrence of reversing the two ends of the stator core 4 in assembling the stator core 4 to the housing 2.

A bonding groove is defined in an outer peripheral surface of the stator core 4, and the stator positioning hole is disposed at a bottom of the bonding groove.

The bonding groove includes a first bonding groove 41 and a second bonding groove 42. The first bonding groove 41 and the second bonding groove 42 are distributed along the circumferential direction of the stator core. The bonding grooves are evenly distributed along the circumferential direction of the stator core for connection. The bonding grooves each have a relatively small size, and thus do not affect the magnetic density distribution and the magnetic flux distribution. At least some of the bonding grooves are drilled with the stator positioning holes corresponding to the positions and numbers of the housing positioning holes 22. The position of the stator positioning holes depends on the sizes of the stator core 4 and the housing 2. Correspondingly, the same bonding groove can be drilled to form a plurality of positioning holes therein, so that the same stator core can meet different sizes of front and rear housings. The first bonding groove 41 is deeper than the second bonding groove 42, and at least the first bonding groove 41 can guide and position the stator core 4 into the housing 2.

In some embodiments, the bonding grooves are accommodating grooves configured to contain a solder material, and optionally the accommodating grooves are strip-shaped grooves. In some embodiments, the potting component 3 is made of the solder material. The material of the potting component 3 is indeed not limited to the solder material.

Figure 4:
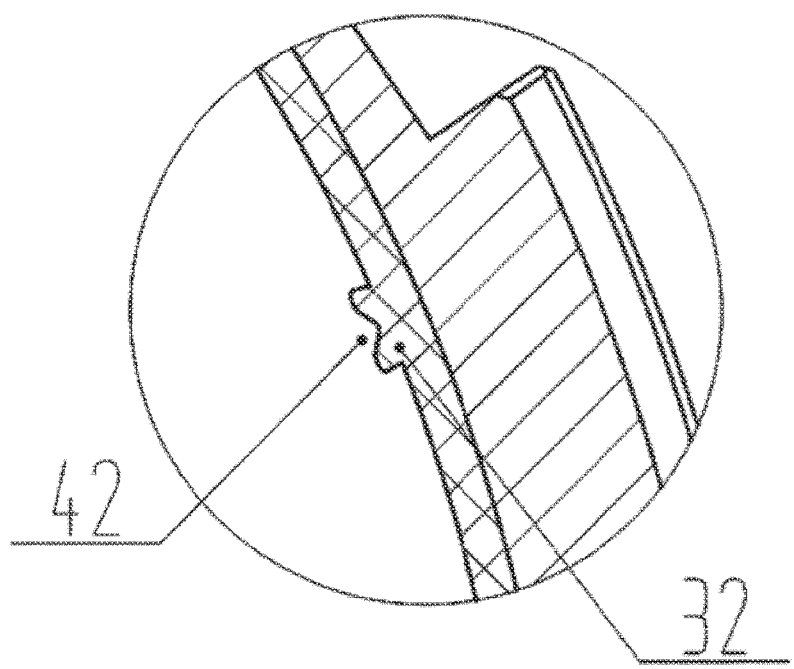
FIG. 4 shows an enlarged view of I in FIG. 3.

As shown in FIG. 4, the potting component 3 further includes a second protruding portion 32 filled in the bonding groove, and the bonding groove extends in the axial direction of the stator core. The bonding groove and the second protruding portion 32 filled in the bonding groove are configured to limit a circumferential movement of the stator core 4 in the housing 2.

The housing 2 defines a first chamber 23 for accommodating the stator core 4 and defines a second chamber 24 for accommodating the coil 5. The recessed portion 21 is located on an inner side wall of the housing 2 defining the first chamber 23. The housing positioning hole 22 is located in the recessed portion 21. There can be one or a plurality of housing positioning holes 22 symmetrically arranged. The housing positioning hole 22 can also be used as an opening for casting the potting component 3.

The stator core 4 is in a transition fit or a small clearance fit with the inner side wall of the first chamber 23. When the stator core 4 is installed in the housing 2, the positioning member 1 is inserted through the housing positioning hole 22 and into the first stator positioning hole 431 to realize the axial and circumferential positioning. A potting tool is used for potting, and after cooling, the potting component 3 is formed. The potting component 3 bonds the stator core 4, the housing 2, and the positioning member 1 together. The potting component 3 is formed with the first protruding portion 31 at the recessed portion 21 and is formed with the second protruding portion 32 at the bonding groove of the stator core 4, enabling the axial and circumferential positioning of itself and the stator core. The potting component 3 fills the radial clearance between the housing 2 and the stator core, which can eliminate the influence of small displacement vibration on the stator core 4 and on control accuracy of the bearing. The thermal expansion coefficient of the potting component 3 is larger than those of the housing 2 and the stator core 4, which can prevent the stator core 4 from getting loose due to the expansion in a high-temperature environment.

By applying the embodiments of the present disclosure, the clearance fit or the transition fit between the stator core and the housing ameliorates the problem of low machining precision existing in the shrink-fitting the stator core into the housing in the related art. The stator of the magnetic levitation bearing of the present embodiments has the following technical effects:

1. The positioning holes are located in the peripheral surfaces of the stator core 4 and the housing 2, and the axial and circumferential positioning of the stator core 4 is realized by connecting means such as bolts or pins.
2. The stator positioning hole is drilled in the bonding groove in the peripheral surface of the stator core 4, not affecting the original magnetic density distribution and bearing performance of the stator core as no new structure is added.
3. There can be two positioning holes in the bonding groove to adapt to different assembly sizes of different types of the housing and the stator core, and to prevent inadvertent errors, prevent reverse installations, and improve fault tolerance.
4. The housing 2 and the stator core 4 are in a clearance fit or transition fit, which reduces the deformation of the housing 2 and the stator core 4, simplifies the assembly process, and reduces the difficulty of processing and assembly.
5. The potting is applied to the bonding groove of the stator core 4 to increase the bonding strength and eliminate the adverse influence of low-amplitude high-frequency vibration.
6. The recessed portion 21 is defined in the side wall of the housing 2, and the side wall is configured for mating with the stator core 4. The recessed portion 21 reduces the mating area between the housing 2 and the stator core 4 and the difficulty of processing and assembly. The recessed portion 21 is in communication with the bonding grooves, which optimizes the potting flow channel and the bonding.
7. The potting component fills the radial clearance between the housing and the stator core, which eliminates the adverse influence of the low-amplitude high-frequency vibration, such as fatigue stress, poor control accuracy, and separation of the stator core and the housing.
8. The potting component 3 includes positioning protruding portions corresponding to the recessed portion 21 of the housing 2 and the bonding groove of the stator core 4, which can realize the circumferential and circumferential positioning, as well as fasten the bolt to prevent it from getting loose and coming out of the positioning hole.

According to another aspect of the present disclosure, a magnetic levitation bearing is also provided. The magnetic levitation bearing includes the above-described stator of the magnetic levitation bearing.

According to another aspect of the present disclosure, a compressor is further provided. The compressor includes the above-described magnetic levitation bearing.

The above descriptions are only exemplary embodiments of the present disclosure and are not intended to limit the present disclosure. Any modification, equivalent replacement, improvement, etc. made within the spirit and principle of the present disclosure shall be included in the protection scope of the present disclosure.

What is claimed is:

1. A stator of a magnetic levitation bearing, comprising:
a stator core;
a stator coil wound around the stator core;
a housing sleeved outside the stator core and having a clearance fit or a transition fit with the stator core; and;
a potting component filled between the housing and the stator core, the potting component extending along an axial direction of the stator core from one end of the stator core to an opposite end of the stator core;
wherein the housing comprises a housing positioning hole, the stator core comprises a stator positioning hole, the stator of the magnetic levitation bearing further comprises a positioning member extending through the housing positioning hole and into the stator positioning hole;
wherein an outer peripheral surface of the stator core comprises a bonding groove, and the stator positioning hole is disposed at a bottom of the bonding groove; and
wherein the potting component further comprises a second protruding portion filled in the bonding groove.

2. The stator of the magnetic levitation bearing according to claim 1, wherein an inner surface of the housing comprises a recessed portion.

3. The stator of the magnetic levitation bearing according to claim 2, wherein the potting component comprises a first protruding portion filled in the recessed portion.

4. The stator of the magnetic levitation bearing according to claim 2, wherein the recessed portion is in an annular shape extending along a circumferential direction of the housing.

5. The stator of the magnetic levitation bearing according to claim 1, wherein the bonding groove extends in an axial direction of the housing.

6. The stator of the magnetic levitation bearing according to claim 1, wherein the bonding groove comprises a first bonding groove and a second bonding groove, and a depth of the first bonding groove is greater than that of the second bonding groove.

7. The stator of the magnetic levitation bearing according to claim 6, wherein the first bonding groove and the second bonding groove are distributed along a circumferential direction of the stator core.

8. The stator of the magnetic levitation bearing according to claim 1, wherein the stator positioning hole comprises:
a first stator positioning hole; and
a second stator positioning hole distributed side by side with the first stator positioning hole along the axial direction of the stator core.

9. The stator of the magnetic levitation bearing according to claim 8, wherein in the axial direction of the stator core, the first stator positioning hole is located in the middle of the stator core, and the second stator positioning hole is located between one end of the stator core and the first stator positioning hole.

10. A magnetic levitation bearing comprising the stator of the magnetic levitation bearing according to claim 1.

11. A compressor comprising the magnetic levitation bearing according to claim 10.

12. The stator of the magnetic levitation bearing according to claim 1, wherein the bonding groove is a plurality of bonding grooves evenly distributed along a circumferential direction of the stator core, and the stator positioning hole is a plurality of stator positioning holes disposed in at least some of the plurality of bonding grooves.

13. The stator of the magnetic levitation bearing according to claim 1, wherein the potting component is made of a solder material.

14. The stator of the magnetic levitation bearing according to claim 1, wherein a thermal expansion coefficient of the potting component is larger than those of the housing and the stator core.

15. A stator of a magnetic levitation bearing, comprising:
a stator core;
a stator coil wound around the stator core;
a housing sleeved outside the stator core and having a clearance fit or a transition fit with the stator core; and
a potting component filled between the housing and the stator core, the potting component extending along an axial direction of the stator core from one end of the stator core to an opposite end of the stator core;
wherein the housing comprises a housing positioning hole, the stator core comprises a stator positioning hole, the stator of the magnetic levitation bearing further comprises a positioning member extending through the housing positioning hole and into the stator positioning hole;
wherein an outer peripheral surface of the stator core comprises a bonding groove, and the stator positioning hole is disposed at a bottom of the bonding groove; and
wherein the bonding groove comprises a first bonding groove and a second bonding groove, and a depth of the first bonding groove is greater than that of the second bonding groove.

16. A stator of a magnetic levitation bearing, comprising:
a stator core;
a stator coil wound around the stator core;
a housing sleeved outside the stator core and having a clearance fit or a transition fit with the stator core; and
a potting component filled between the housing and the stator core, the potting component extending along an axial direction of the stator core from one end of the stator core to an opposite end of the stator core;
wherein the housing comprises a housing positioning hole, the stator core comprises a stator positioning hole, the stator of the magnetic levitation bearing further comprises a positioning member extending through the housing positioning hole and into the stator positioning hole; and
wherein the stator positioning hole comprises:
a first stator positioning hole; and
a second stator positioning hole distributed side by side with the first stator positioning hole along the axial direction of the stator core.

* * * * *